United States Patent
Hawkins

(10) Patent No.: US 7,672,938 B2
(45) Date of Patent: Mar. 2, 2010

(54) CREATING SEARCH ENABLED WEB PAGES

(75) Inventor: Jonathan C. Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 11/868,304

(22) Filed: Oct. 5, 2007

(65) Prior Publication Data

US 2009/0094249 A1    Apr. 9, 2009

(51) Int. Cl.
  *G06F 17/30* (2006.01)
(52) U.S. Cl. .............................. 707/3; 707/10; 715/234; 709/203
(58) Field of Classification Search ............ 707/1, 707/3–5, 10, 102, 104.1; 709/203; 715/200, 715/205, 234
See application file for complete search history.

(56) References Cited

U.S. PATENT DOCUMENTS

| | | |
|---|---|---|
| 6,665,658 B1 | 12/2003 | DaCosta et al. |
| 7,143,088 B2 | 11/2006 | Green et al. |
| 2006/0070022 A1 | 3/2006 | Ng et al. |
| 2006/0190561 A1 | 8/2006 | Conboy et al. |
| 2006/0230011 A1 | 10/2006 | Tuttle et al. |
| 2006/0248166 A1 | 11/2006 | Milosevic et al. |
| 2007/0061700 A1* | 3/2007 | Kothari et al. ............... 715/505 |
| 2007/0101258 A1 | 5/2007 | Xu et al. |
| 2007/0113188 A1 | 5/2007 | Bales et al. |
| 2008/0235325 A1* | 9/2008 | Calvert et al. ............... 709/203 |

OTHER PUBLICATIONS

Hawkins, Jonathan, jhawk's WebLog, "Search enabling Silverlight and AJAX web applications", 2007, 3 pages http://blogs.msdn.com/jhawk/archive/2007/05/23/searching-enabling-silverlight-and-ajax-web-applications.aspx.
TechPatterns.com, "Scripts-Javascript Browser & OS Detection", Browser Detector Scripts—Javascript, 2007, 3 pages http://techpatterns.com/downloads/javascript_browser_detection.php.
Kothari, Nikhil, "SEO for Ajax and Silverlight Applications", 2007, 9 pages http://www.nikhilk.net/AjaxSEO.aspx.

* cited by examiner

*Primary Examiner*—Cheryl Lewis
(74) *Attorney, Agent, or Firm*—Workman Nydegger

(57) ABSTRACT

The present invention extends to methods, systems, and computer program products for creating search enabled Web pages. A search engine crawler requests a Web page. A Web server receives the request and constructs a Web page that includes client-side script configured to obtain a portion of content at a Web browser. The Web server inserts textual (e.g., HTML) hinting data for the client-side script into the Web page. When analyzed at the search engine, the textual hinting data provides similar analysis results to analysis results obtained from analyzing the portion of content that is to be obtained at through execution of the client-side script. Thus, the Web server can provide the search engine with information to sufficiently index the Web page even when the search engine lacks the capability to execute the client-side script.

17 Claims, 2 Drawing Sheets

CREATING SEARCH ENABLED WEB PAGES

CROSS-REFERENCE TO RELATED APPLICATIONS

N/A.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") at the Web browser). A URL includes (among other data) a domain portion that identifies the organization controlling requested content and a path portion that indicates the location of the content within a namespace of the organization The domain portion of the URL is resolved to a Web server under the control of the organization. The path portion of the URL is then sent to the Web server. The Web server uses the path portion to determine what content is being requested and how to access the requested content. The Web server then accesses the requested content and returns the requested content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaScript, VB Script, ASP, PHP, Perl, or ASP .Net.

A web server can maintain pages that include both server-side and client-side scripts. Server-side scripts can be used to obtain data accessible to a Web server for inclusion in a corresponding Web page. Client side scripts are useful for acquiring and presenting data that may be unique to a client machine, such as, for example, a local time and date or data that is accessible via external Web services.

When a Web server receives a Web browser request for a Web page that includes server-side script, the Web server passes the server-side script off to an appropriate script engine. The script engine processes the script to perform actions on relevant data and potentially returns portions of the relevant data, for example, represented in corresponding HTML directives. Any portions of relevant data, for example, the representative HTML directives, are then injected into a Web page for return to the Web browser (along with any client-side scripts).

For example, if a server-side script is configured to query and return 10 database rows, the script engine returns the 10 database rows in a HTML format to the Web server. The Web server then injects the HTML representing the 10 database rows into any other HTML directives and client-side scripts in the Web page. After all server-side scripts are processed, the resulting HTML from processing the server side-scripts, other HTML, and any client-side scripts are sent back to the Web browser.

Client-side scripts can be embedded in a Web page or can be included in a separate file. When a client-side script is included in an external file, a Web page can include a script reference (e.g., <script type="text/javascript" src="hello.js"></script>) referencing the script. Client-side scripts and script references can be included in-line in a Web page that is sent to a Web browser. Thus, as the Web browser processes the Web page it can encounter embedded client-side scripts as well as script references to client-side scripts. As client-side scripts (are executed (e.g., at a client-side script processor) other dynamic data, such as, for example, from external Web services can be added to a Web page.

However, the usefulness of the client/server model used on the WWW is highly dependent having access to appropriate URLs. That is, a user must have prior knowledge of or at least being able to easily obtain a URL for content they desire to request. Without an appropriate URL for a portion of content, a user essentially has not way to request the content. However, prior knowledge of a URL can be obtained in a variety of ways, such as, for example, through prior access to a Website, a stored favorite, etc. Further, even without express knowledge of a URL, URLs can be followed from links in other Web pages, obtained through search engines, etc.

Thus, inevitably a user will desire to request content without having access to an appropriate URL for the content. Search engines can be particularly useful in these circumstances. In fact, it is quite common for users to initiate a search for content utilizing a search engine. For example, a user can enter one or more search terms into a search engine. In response, the search engine will typically return a list of different URLs (typically included in hyperlinks) that can be utilized to access content related to the entered search terms. The user can then utilize a returned URL to access (most likely relevant) content at a Website.

However, the accuracy of a search engine's search results is highly dependent on the search engine having previously obtained information indicating that a URL corresponds to content relevant to an entered search term. As a result, many search engines utilize automated programs (often referred to as crawlers, bots, spiders, etc.) that continually scan the WWW to find Websites and index Website URLs. Automated indexing programs are typically configured to process HTML looking for keywords and then match keywords to URLs where the keywords are located. Search engines locate and index billions of Web pages using these automated programs. Thus, search results often include a (potentially) large number of Websites that include content relevant to entered search terms.

Unfortunately, due to the sheer volume of Websites connected to the WWW, it is inevitable that a search engine does not return a Website, even though content at the Website is relevant to entered search terms. This can occur, for example, when a Website was recently launched and an automated program has not yet indexed the Website. As such, search engines also permit Website operators to submit information that can be used to identify content from their Website in search results. For example, a Website operator can submit a domain name to a search engine. In response, the search engine directs an automated program to the domain and indexes URLs within the domain.

However, even with knowledge of a domain name, automated indexing programs may fail to completely index all the URLs of a Website. This can occur, for example, when a Website is not well connected through multiple links to other Websites or when the Website was unavailable when an automated program attempted to index the Website. Further, even if a Website is available and has well connected links, the design of the Website may be difficult to index. For example, a Website may include content (e.g., AJAX, Flash, etc.) that automated indexing programs simply can not navigate.

Further Website indexing difficulties can result when portions of data included in a resulting Web page are obtained through client-side script execution. For example, in response to a request for a Web page, it may be that a Web server returns a client-side script or reference thereto designed for execution at a Web browser. Accordingly, when the requesting entity is a Web browser, the Web browser can execute the script, obtain the data, and include the data in a Web page for rendering at the Web browser.

However, automated indexing programs request Web pages in essentially the same manner as Web browsers. Thus, Web servers will inevitably return a Web page that includes a client-side script or reference thereto to an automated indexing program. As previously described, automated indexing programs are typically configured to process HTML. On the other hand, automated indexing programs typically lack script engine functionality. Thus, when receiving a Web page, an automated indexing program typically processed included HTML and ignores any other content (e.g., scripts and script references) included in the Web page. As a result, a Web page including client-side script may be insufficiently indexed, due at least in part to the inability of automated indexing programs to access the entire content for the Web page.

BRIEF SUMMARY

The present invention extends to methods, systems, and computer program products for creating search enabled Web pages. A search engine sends a request for a Web page to a Web server. The Web server receives the request for the Web page. The Web server accesses a page file for the requested Web page. The page file includes client-side script for execution at a Web browser. The client-side script is configured to cause the Web browser to obtain a portion of content for inclusion in the Web page at the Web browser. The page file also includes server-side script configured for execution at the Web server to create textual hints corresponding to the portion of content that is to be obtained at the Web browser.

The Web server executes the server-side script to create the textual hints corresponding to the portion of content that is to be obtained at the Web browser. The Web server includes the textual hints along with the client-side script in the requested Web page. The Web server returns the Web page to the requesting entity in response to receiving the request. The Web server returns the Web page.

The search engine receives the Web page from the Web server. The search engine indexes the textual hints included in the Web page to identify the relevancy of keywords for the portion of content that is to be obtained at the Web browser. The indexing is performed notwithstanding that the search engine is not configured to execute the client-side script to obtain the portion of content that is to be obtained at the Web browser. The search engine stores the Web page along with the relevancy of the keywords for the portion of content that is to be obtained at the Web browser. Accordingly, the Web page is returnable in search results for searches that use the keywords.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
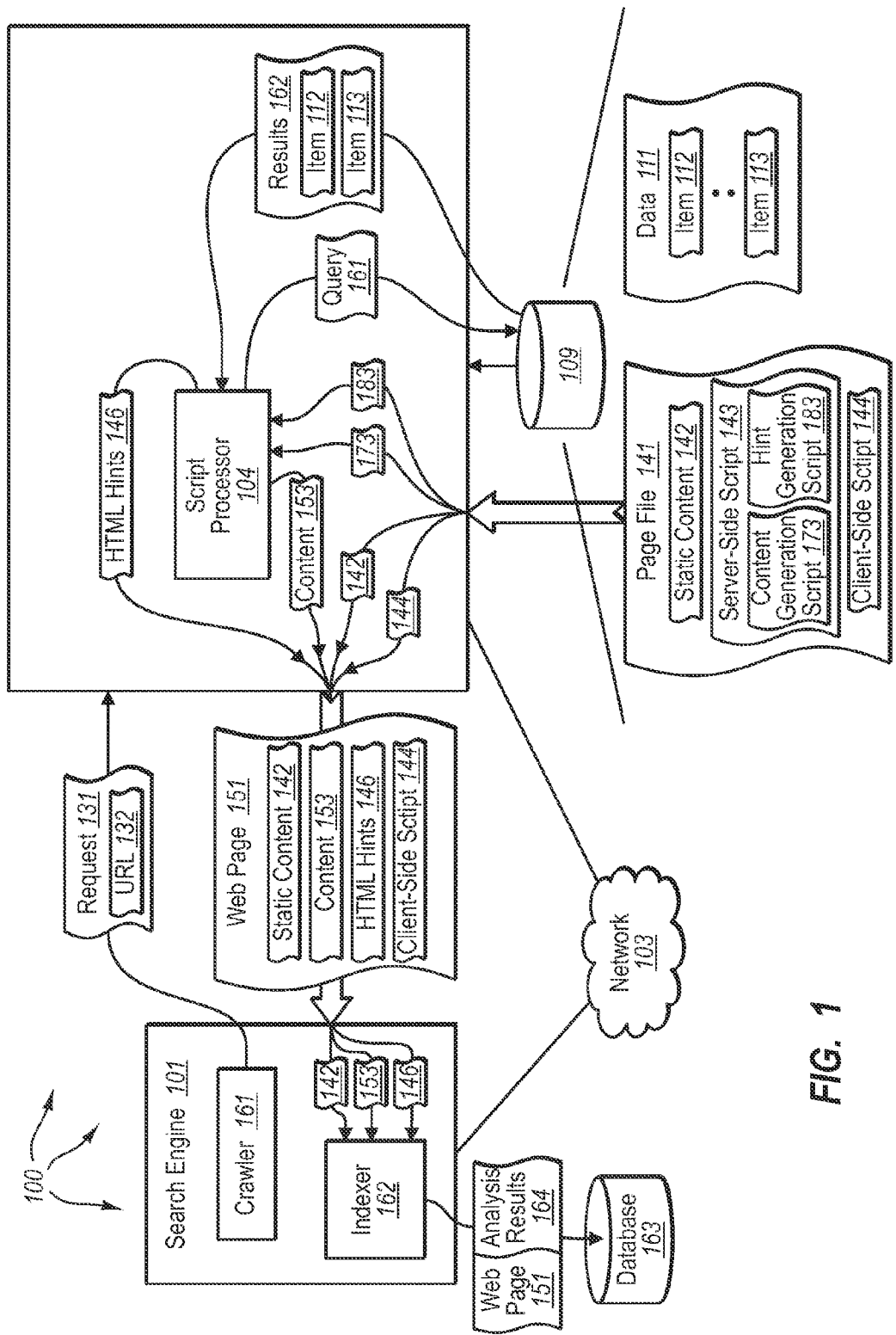
FIG. 1 depicts an example computer architecture that facilitates creating search enabled Web pages.

The present invention extends to methods, systems, and computer program products for creating search enabled Web pages. A search engine sends a request for a Web page to a Web server. The Web server receives the request for the Web page. The Web server accesses a page file for the requested Web page. The page file includes client-side script for execution at a Web browser. The client-side script is configured to cause the Web browser to obtain a portion of content for inclusion in the Web page at the Web browser. The page file also includes server-side script configured for execution at the Web server to create textual hints corresponding to the portion of content that is to be obtained at the Web browser.

The Web server executes the server-side script to create the textual hints corresponding to the portion of content that is to be obtained at the Web browser. The Web server includes the textual hints along with the client-side script in the requested Web page. The Web server returns the Web page to the requesting entity in response to receiving the request. The Web server returns the Web page.

The search engine receives the Web page from the Web server. The search engine indexes the textual hints included in the Web page to identify the relevancy of keywords for the portion of content that is to be obtained at the Web browser.

The indexing is performed notwithstanding that the search engine is not configured to execute the client-side script to obtain the portion of content that is to be obtained at the Web browser. The search engine stores the Web page along with the relevancy of the keywords for the portion of content that is to be obtained at the Web browser. Accordingly, the Web page is returnable in search results for searches that use the keywords.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates searching Web pages for Web browser applications. Depicted in computer architecture 100 are search engine 101 and Web server 102. Search engine 101 and Web server 102 are connected to one another over network 103, such as, for example, a Local Area Network ("LAN"), a Wide Area Network ("WAN"), or even the Internet. Accordingly, components at each of search engine 101 and Web server 102, as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, search engine 101 is configured to download and analyze Web pages so that the Web pages can be returned in search results in response to a user keyword search. Search engine 101 includes crawler 161, indexer 162, and database 163. Crawler 161 is configured to download Web pages and following links between Web pages. Indexer 162 is configured to separate and analyze various components of downloaded Web pages, such as, for example, titles, headings, outbound links, inbound links, insite links, text, constructs, styles (e.g., bold, italics, etc.), etc. Downloaded Web pages and corresponding analysis are stored at database 163.

Search engine 101 can also include a search engine results engine (not shown) that determines what Web pages match a user's search. When a user enters a keyword and does a search, the search engine results engine can use a matching algorithm to determine matches based on various criteria. The various criteria can include: determining if a keyword is in the title or domain/URL of Web page, how many times a keyword is included in a Web page, is a keyword bolded, italicized, or included in large headings in a Web page, is the keyword included in inbound and/or outbound links from the Web page, etc. When the search engine results engine returns results, Web pages satisfying more of the various criteria are ranked higher.

Generally, Web server 102 is configured to receive requests for Web pages from requesting entities and return requested Web pages to the requesting entities. Requesting entities include Web browsers and search engine crawlers. In response to receiving a Web page request (e.g., a URL), Web server 102 can access a page file. A page file can include data and/or code for formulating a requested Web page. For example, a page file can include static content (e.g., HTML) for inclusion in a requested Web page. A page file can also include code (ASP, ASP .NET, PHP, JSP, etc.) to be executed at Web server 102 to create further content (e.g., more HTML) at Web server 102 for inclusion in the Web page. A page file can also include code to be executed at a Web browser to create further content (e.g., accessed via Web services calls) at the Web browser for inclusion in the Web page.

Thus in response to a Web page request, Web server 102 can access an appropriate page file. Web server 102 can include any static content in a Web page for return to the requesting entity. Script processor 104 can run any server-side code included in the page file. Execution of the server-side code can create further content (e.g., further HTML) that is included in the Web page along with the static content. Web server 102 also includes any client-side code from the page file within the Web page for execution at a Web browser. Web browser 102 then returns the Web page to the requesting entity, such as, for example, a search engine crawler or Web browser.

Figure 2:
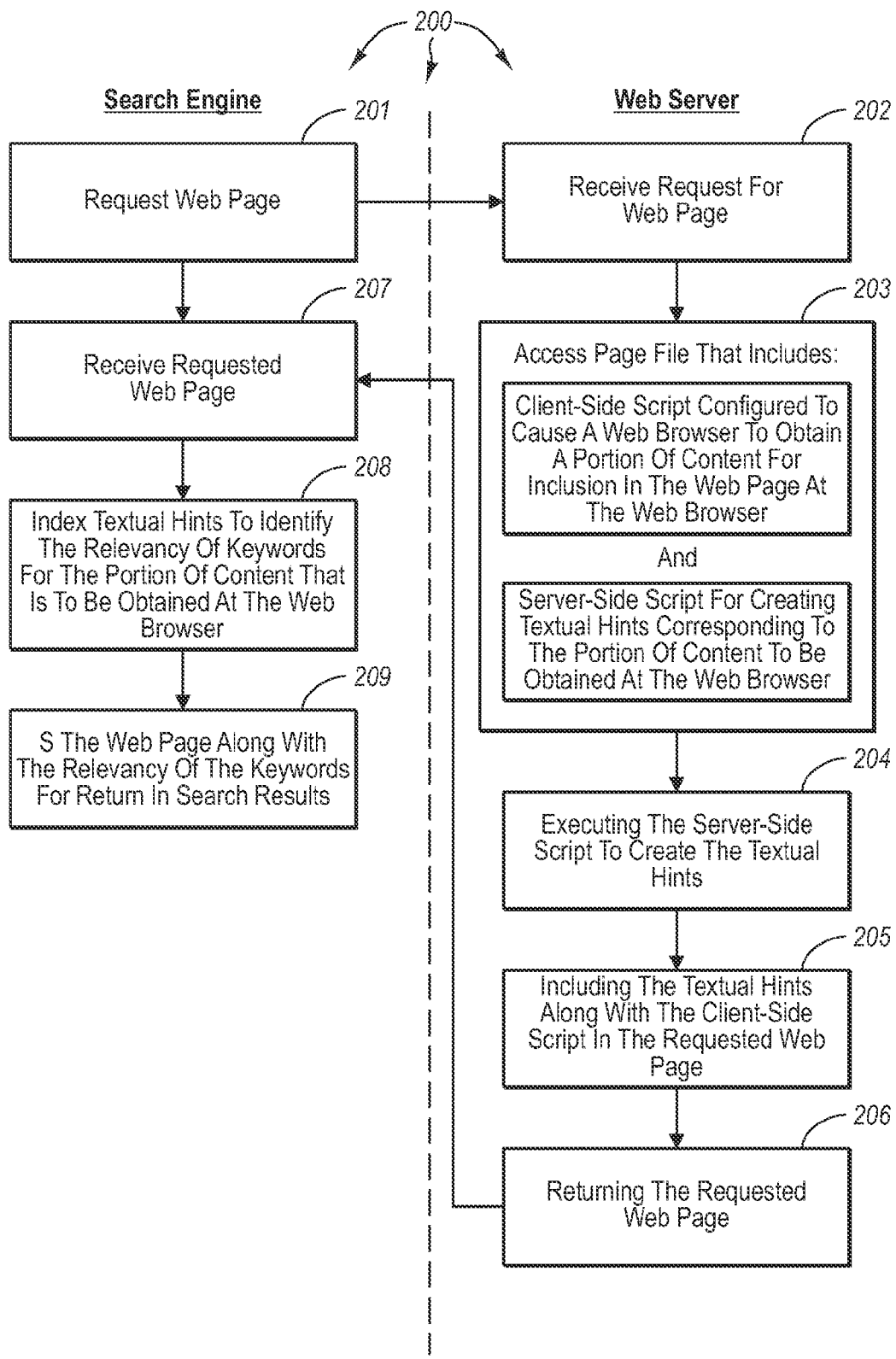
FIG. 2 illustrates a flow chart of an example method for creating search enabled Web pages.

FIG. 2 illustrates a flow chart of an example method 200 for creating search enabled Web pages. The method 200 will be described with respect to the components and data of computer architecture 100.

Method 200 includes an act of requesting a Web page (act 201). For example, search engine 101 can send request 131 to Web server 102. Request 131 includes URL 132 that can be resolved to a specified Web page under the control of Web server 102. Method 200 includes an act of receiving a request for a Web page (act 202). For example, Web server 102 can receive request 131 from search engine 101. Web server 102 can resolve URL 132 to a Web page based on page file 141.

Method 200 includes an act of accessing a page file (act 203). The page file includes client-side script for execution at a Web browser, the client-side script configured to cause the Web browser to obtain a portion of content for inclusion in the Web page at the Web browser. The page file also includes server-side script configured for execution at the Web server to create textual hints corresponding to the portion of content that is to be obtained at the Web browser.

For example, Web server 102 can access page file 141. As depicted, page file 141 includes static content 142 (e.g., HTML text), server-side script 143 (e.g., ASP, ASP .NET, PHP, JSP, etc.), and client-side script 144. Client-side script 144 is configured for execution at a Web browser to obtain (e.g., through Web service calls) a portion of content for inclusion in a Web page at the Web browser.

Sever-side script 143 further includes content generation script 173 and hint generation script 183. Content generation script 173 is configured for execution at Web server 102 to create further content (e.g., more HTML) for inclusion in the Web page. Generally, hint generation script 183 is configured to generate HTML textual data that, when analyzed at a search engine, provides similar analysis results to analysis results obtained from analyzing the portion of content that is to be obtained through execution of client-side script 144 at a Web browser. In some embodiments, the HTML textual data describes the portion of content that is to be obtained through execution of client-side script 144. For example, hint generation script 183 can be configured for execution at Web server 102 to create additional HTML describing the portion of content that is to be obtained through execution of client-side script 144. In some embodiments, hint generation script 183 can also be configured to generate a portion of content similar to or even essentially the same as the portion of content that is to be obtained through execution of client-side script 144.

In some embodiments, a page file includes a div or panel that contains flat HTML. That is, generation of the HTML does not rely on client code (e.g., AJAX techniques [DOM and JavaScript] and/or RIA techniques [using browser plug-ins such as silverlight]). The HTML content provides search engines with links to follow. The following first code sample is an example of a page file that contains flat HTML content paired with dynamic content:

```
1. <body>
2.   <form id="form1" runat="server">
3.     <div id="dynamic_content">
4.       ... Dynamic Content here
5.       <script type="text/javascript">
6.       </script>
7.     </div>
8.     <asp:Panel ID="flat_html_panel" runat="server">
9.       ... Flat HTML Content here
10.    </asp:Panel>
11.  </form>
12. </body>
```

However in other embodiments, data is rendered into HTML text using server-side data controls. The following second code sample is an example of a server-side data control that can be used to render HTML text for a specified product:

```
21.  <asp:DetailsView ID="DetailsView1" runat="server"
22.     DataKeyNames="ProductID"
23.     DataSourceID="SqlDataSource1">
24.     ...
25.  </asp:DetailsView>
26.  <asp:SqlDataSource ID="SqlDataSource1" runat="server" ... >
27.  
28.  </asp:SqlDataSource>
```

Lines 21-28 of the second code sample can be substituted for line 9 in the first code sample. The second code example takes in the QueryString parameter of ProductID, uses SqlDataSource to make a database call and renders HTML text in the flat html panel. Accordingly, use of a div or panel can provide text browsers (e.g., Lynx) content to render and search engine crawlers content to index.

Other types of server side controls can provide data navigation links (HTML anchor tags) for use with text browsers and search engine crawlers. The following third code sample is an example of a server-side data control that can be used to generate data navigation links:

```
31. <asp:DataLinks ID="dataLinks" runat="server"
32.     DataType="ProductData, App_Code"
33.     TargetUrl="Products.aspx"
34.     QueryStringDataFields="ProductID"
35.     LinkNameDataFields="ProductName"
36.     LinkableMethod="ShowProducts"
37. </asp:DataLinks>
```

Lines 31-37 of the third code sample can be substituted for line 9 in the first code sample. Execution of the third code sample renders HTML content that text browsers can render to a user and search engines can crawl and index. This increases the likelihood of a text browser being able to navigate to all the products and that search engine crawlers can index all the products. For example, depending on the contents of "SqlDataSource1" (see line 23 of the second code sample), execution of the third code sample can render HTML content similar to:

```
<a href="http://somesite.com/Product.aspx?ProductID=4">Chef
Anton's Cajun Seasoning</a>
<a href="http://somesite.com/Product.aspx?ProductID=8">Northwoods
Cranberry Sauce</a>
```

To render data navigation links, line 32 refers to a derived class ProductData (stored in an application code directory) that can be used to access data items. Derived classes can be utilized in different ways to provide data navigation links for different portions of data. However, in the third code sample, ProductID is used to query SqlDataSource1 (e.g., through a DataQuery method of ProductData) to associate product IDs with Product Names.

The LinkableMethod "ShowProducts" indcates that content output by ShowProdcuts is linkable. Linkable methods can be methods that are run when a page is first loaded. Identifying or tagging methods as linkable provides developers with a relatively safe way to specify which methods are linkable. For example, the method "ShowProducts" can be decorated with a tag in a manner similar to:

```
[Linkable]
void ShowProducts(String ProductID)
{
// . . . make web service call to obtain data and render UI
}
```

Linkable methods can be used for AJAX and RIA applications. When a method is not tagged as linkable, selection of the link returns as default page similar to if there where no code behind the link.

Accordingly, method 200 can include an act of executing the server-side script to create the textual hints (act 204). For example, script processor 104 can execute hint generator script 183 to create HTML 146 hints corresponding to the portion of content that is to be obtained through execution of client-side script 144. Upon accessing page 141, Web server 102 can forward generation script 183 to script processor 104.

Script processor 104 can execute hint generation script 183 to issue query 161 to storage 109. Query 161 can be a query for data contained in data 111 (e.g., database rows, columns, etc.). In response to query 161, results 162 can be returned to script processor 104. As depicted, results 162 include items 112 and 113.

Items 112 and 113 can be data items that are at least related to the portion of content that is to be obtained through execution of client-side script 144 at a Web browser. In some embodiments, a returned data item is the portion of content that is to be obtained through execution of client-side script at a Web browser. Alternately or in combination with accessing data items from data 111, script processor 104 can execute hint generation script 183 to issue Web services calls to other data sources. The Web services calls can also be used to obtain data items that are at least related to the portion of content that is to be obtained through execution of client-side script 144 at a Web browser.

Script processor 104 can also execute hint generation script 183 to generate HTML hints from any returned data items. For example, script processor 104 can generate HTML hints 146 from items 112 and 113, any data items returned from Web services calls, etc. When analyzed at a search engine, HTML hints 146 are configured to provide similar analysis results to analysis results obtained from analyzing the portion of content that is to be obtained through execution of client-side script 144 at a Web browser. For example, HTML hints 146 can describe the portion of content that is to be obtained through execution of client-side script 144 at a Web browser. In some embodiments, HTML hints 146 contains a portion of content similar to or even essentially the same as the portion of content that is to be obtained through execution of client-side script 144.

HTML hints 146 can also include links to other Web pages that can be subsequently requested by crawler 161.

Method 200 includes an act of including the textual hints along with the client-side script in the requested Web page (act 205). For example, Web server 102 can include HTML hints 146 along with client-side script 144 in Web page 151. Web server 102 can also include static content 142 and content 153 in Web page 151. Script processor 104 can execute content generation script 173 to create content 153 (e.g., data from a database, from a Web service, etc.).

Method 200 includes an act of returning the requested Web page (act 206). For example, Web server 102 can return Web page 151 to search engine 101 in response to receiving request 131. Method 200 includes an act of receiving the requested Web page (act 207). For example, search engine 101 can receive Web page 151 from Web server 102. As depicted, Web page 151 includes static content 142, content 153, HTML hints 146, and client-side script 144. As previously described, HTML hints 146 at least describe the portion of content that is to be obtained through execution of client-side script 144 at a Web browser.

Method 200 includes an act of indexing textual hints to identify the relevancy of keywords for the portion of content that is to be obtained at the Web browser (act 208). For example, indexer 162 can analyze HTML hints 146 to identify the relevancy of keywords for the portion of content that is to be obtained through execution of client-side script 144. Indexer 162 can also analyze static content 142 and content 153 to identify the relevancy of other keywords in Web page 151. Accordingly, HTML hints 146 facilitate appropriate indexing of Web page 151 even when search engine 101 is not configured to execute client-side script 144 to obtain the portion of content that is to be obtained at a Web browser.

Method 200 includes an act of storing the Web page along with the relevancy of the keywords for return in search results (act 209). For example, indexer 162 can store Web page 151 along with analysis results 164 in database 163. Analysis results 164 contains the results of indexer 162's analysis of Web page 151, including analysis of HTML hints 146, static content 142, and content 153. Thus, Web page 151 can be returned in a search result in response to receiving searches that use keywords identified in HTML hints 146. Accordingly, the keywords are also relevant to the portion of content that is to be obtained through execution of client-side script 144.

In some embodiments, a further decision is made whether or not to show flat HTML content. When a requesting entity is configured to process client-side script, flat HTML can still be returned to the requesting entity. However the flat HTML does not necessarily have to be displayed. For example, if a browser is capable executing client-side script 144, there is little, if any, need to display HTML hints 146. Thus before sending a Web page, Web server can detect if a requesting entity supports JavaScript, ActiveX controls, browser plug-ins, etc. A helper method like IsFlatBrowser can determine whether a requesting entity supports JavaScript, ActiveX controls, etc. using a variety of techniques including but not limited to using browser capability files. For example, static bool DynamicHelper.IsFlatBrowser( )

can be used to show or not show the flat content.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a Web server, a method for providing a searchable Web page in response to a Web page request, the method comprising:
    an act of receiving a request for a Web page from a requesting entity;
    an act of accessing a page file for the requested Web page, the page file including:
        client-side script for execution at a Web browser, the client-side script configured to cause the Web browser to obtain a portion of content for inclusion in the Web page at the Web browser; and
        server-side script configured for execution at the Web server to create HTML textual hints relevant to keywords in the portion of content for inclusion in the Web page at the Web browser;
    an act of executing the server-side script to create the HTML textual hints corresponding to the portion of content that is to be obtained at the Web browser;
    an act of including the HTML textual hints along with the client-side script in the requested Web page; and
    an act of returning the requested Web page to the requesting entity in response to receiving the request.

2. The method as recited in claim 1, wherein the act of accessing a page file for the requested Web page comprises an act of accessing an ASP NET file.

3. The method as recited in claim 1, wherein the act of accessing a page file for the requested Web page comprises an act of accessing a page file that includes server-side script configured for execution at the Web server to create HTML anchor tags that are navigable by a search engine crawler.

4. The method as recited in claim 1, wherein the act of accessing a page file for the requested Web page comprises an act of accessing a page file that includes server-side script configured for execution at the Web server to create content similar to the portion of content the client-side script is configured to generate.

5. The method as recited in claim 1, wherein the act of executing the server-side script to create the textual hints comprises an act of creating HTML hints.

6. The method as recited in claim 5, wherein the act of creating HTML hints comprises an act of rendering accessed data into HTML hints.

7. The method as recited in claim 6, wherein the act of rendering accessed data into HTML hints comprises an act of rendering data from a database into HTML hints.

8. The method as recited in claim 6, wherein the act of rendering accessed data into HTML hints comprises an act of rendering data returned from a Web services call into HTML hints.

9. The method as recited in claim 1, wherein the act of including the textual hints along with the client-side script in the requested Web page comprises an act of including HTML hints along with the client-side script, the HTML hints configured such that, when analyzed at a search engine, provide similar analysis results to analysis results obtained from analyzing the portion of content that is to be obtained through execution of the client-side script.

10. At a search engine, a method for indexing a Web page that includes client-side script, the method comprising:
    an act of sending a request for a Web page to a Web server;
    an act of receiving the Web page from the Web server, the Web page including:
        client-side script for execution at a Web browser, the client-side script configured to cause the Web browser to obtain a portion of content for inclusion in the Web page at a Web browser; and
        textual hints relevant to keywords in the portion of content obtained through execution of the client-side script; and
    an act of indexing the textual hints included in the Web page to identify the relevancy of keywords for the portion of content that is to be obtained at the Web browser notwithstanding that the search engine is not configured to execute the client-side script to obtain the portion of content that is to be obtained at the Web browser; and
    an act of storing the Web page along with the relevancy of the keywords for the portion of content that is to be obtained at the Web browser such that the Web page is returnable in search results for searches that use the keywords.

11. The method as recited in claim 10, wherein the act of receiving a Web page that includes HTML hints relevant to keywords in the portion of content for inclusion in the Web page at the Web browser comprises an act of receiving HTML hints configured such that, when analyzed at the search engine, provide similar analysis results to analysis results obtained from analyzing the portion of content that is to be obtained through execution of the client-side script.

12. The method as recited in claim 10, wherein the act of receiving the Web page from the Web server comprises an act of receiving a Web page that includes HTML anchor tags that are navigable by a search engine crawler, the HTML anchor tags and links generated in the client-side script linking to similar content such that the search engine can sufficiently index the Web page without executing the client-side script.

13. The method as recited in claim 10, wherein the act of indexing the textual hints comprises an act of indexing HTML hints such that the Web page can be returned in search results for keywords that match the portion of content obtained through execution of the client-side script.

14. A computer program product for use at a Web server, the computer program product for implementing a method for providing a searchable Web page in response to a Web page request, the computer program product comprising one or more physical storage media having stored thereon computer-executable instructions that, when executed at a processor, cause the Web server to perform method, including the following:
    receive a request for a Web page from a search engine crawler;
    access a page file for the requested Web page, the page file including:
        client-side script for execution at a Web browser, the client-side script configured to cause the Web browser to obtain a portion of content for inclusion in the Web page at the Web browser; and
        server-side script configured for execution at the Web server to create HTML textual hints relevant to keywords contained in the portion of content that is to be obtained at the Web browser;

include the HTML hints along with the client-side script in the requested Web page to enable the search engine to sufficiently index the portion of content to be obtained through execution of the client-side script even though the search engine lacks the capability to execute the client-side script;

return the requested Web page to the requesting entity in response to receiving the request.

15. The computer program product as recited in claim 14, further comprising computer-executable instructions that, when executed, cause the Web server to execute the server-side script to create the additional HTML hints corresponding to the portion of content that is to be obtained at the through execution of the client-side script.

16. The computer program product as recited in claim 15, wherein computer-executable instructions that, when executed, cause the Web server to create the additional HTML hints corresponding to the portion of content that is to be obtained at the through execution of the client-side script comprise computer-executable instructions that, when executed, cause the Web server to render database data into the additional HTML hints.

17. The computer program product as recited in claim 14, wherein computer-executable instructions that, when executed, cause the Web server to create the additional HTML hints corresponding to the portion of content that is to be obtained at the through execution of the client-side script comprise computer-executable instructions that, when executed, cause the Web server to render data from a Web services call into the additional HTML hints.

* * * * *